(12) United States Patent
Hsieh

(10) Patent No.: US 8,797,333 B2
(45) Date of Patent: Aug. 5, 2014

(54) VIDEO WALL SYSTEM AND METHOD FOR CONTROLLING THE SAME

(75) Inventor: Chisen Hsieh, Taoyuan Hsien (TW)

(73) Assignee: Delta Electronics, Inc., Taoyuan Hsien (TW)

(*) Notice: Subject to any disclaimer, the term of this patent is extended or adjusted under 35 U.S.C. 154(b) by 515 days.

(21) Appl. No.: 13/175,948

(22) Filed: Jul. 4, 2011

(65) Prior Publication Data

US 2012/0229477 A1 Sep. 13, 2012

(30) Foreign Application Priority Data

Mar. 7, 2011 (CN) .......................... 2011 1 0063313

(51) Int. Cl.
*G06F 15/16* (2006.01)
*G06F 3/14* (2006.01)

(52) U.S. Cl.
CPC ........ *G06F 3/1446* (2013.01); *G09G 2300/026* (2013.01); *G06F 3/1438* (2013.01)
USPC ....................................... 345/502

(58) Field of Classification Search
CPC ........... G06F 13/42; G09G 5/363; G06T 1/20
See application file for complete search history.

(56) References Cited

U.S. PATENT DOCUMENTS

2011/0122048 A1* 5/2011 Choi et al. .................... 345/1.1

FOREIGN PATENT DOCUMENTS

| CN | 1331071 C | 8/2007 |
| CN | 101847135 A | 9/2010 |

* cited by examiner

*Primary Examiner* — Edward Martello
(74) *Attorney, Agent, or Firm* — CKC & Partners Co., Ltd.

(57) ABSTRACT

A method for controlling a video wall system, in which the video wall system includes a plurality of host processors. The method includes the step of transmitting a plurality of continuous commands without time interval therebetween one by one to the host processors and the step of the host processors synchronously performing corresponding operations according to the commands. A video wall system is also disclosed herein.

10 Claims, 4 Drawing Sheets

VIDEO WALL SYSTEM AND METHOD FOR CONTROLLING THE SAME

RELATED APPLICATIONS

This application claims priority to Chinese Patent Application Serial Number 201110063313.8, filed Mar. 7, 2011, which is herein incorporated by reference.

BACKGROUND

1. Technical Field

The present disclosure relates to a video displaying system. More particularly, the present disclosure relates to a video wall system and a method for controlling the same.

2. Description of Related Art

For a conventional large-sized displaying apparatus (e.g. video wall) consisting of a plurality of displays arranged in matrix, it is provided that several displays are used together to display a large and complete image. Particularly, the displays are able to display a number of same images concurrently or to display different images, respectively, which can be achieved by using video processing devices to process image signals and to transmit the image signals to the respective displays.

In regard to the techniques of the video wall, a transmission interface is mainly provided to transmit related control signals or commands so as to control a number of host processors.

However, since the video wall has to cooperate with several host processors so that the displays can show the same or different images and even each of the host processors normally needs a time period to process the command after receiving the command, the stability and consistence of the host processors receiving and processing the commands have become an important issue.

For example, when the video wall operates, a control terminal normally transmits a series of commands to each of the host processors, and each of the host processors is usually a simplex system, so each of the host processors has to employ a certain time period to process a command after receiving the command, and then the other command can be received normally after the processing procedure is finished. Thus, the action of transmitting commands has to be cooperated with the systems mentioned above in which a sufficient period of delay time is added between two neighboring commands, making sure that each command is able to be executed correctly by each of the host processors. However, a large amount of delay time is generated accordingly, causing the efficiency of the whole system to deteriorate.

SUMMARY

The present disclosure is to provide a video wall system and a method for controlling the same so as to solve the problem of the efficiency of the whole system deteriorating, caused when the video wall system operates.

An aspect of the present invention provides a method for controlling a video wall system, in which the video wall system comprises a plurality of host processors connected in series. The method comprises the following steps. A plurality of continuous commands without time interval therebetween are transmitted one by one to the host processors connected in series and the host processors synchronously performs corresponding operations in accordance with the commands.

In accordance with one embodiment of the present invention, the commands are RS232 commands transmitted from an RS232 serial data communication interface.

In accordance with another embodiment of the present invention, a first command of the commands comprises an identification message, and the identification message is provided for identification of the first command and the following commands being continuously transmitted without time interval therebetween.

In accordance with yet another embodiment of the present invention, the step of the host processors synchronously performing the corresponding operations in accordance with the commands further comprises the steps of each of the host processors temporarily storing and identifying the commands and each of the host processors synchronously performing the corresponding operation in accordance with a corresponding one of the identified commands.

Another aspect of the present invention provides a video wall system which comprises a controller and a plurality of host processors connected in series. A transmitting end of the controller is connected to a receiving end of a first host processor of the host processors. The controller is configured for transmitting a plurality of continuous RS232 commands without time interval therebetween to each of the host processors, and the host processors synchronously perform corresponding operations in accordance with the RS232 commands.

In accordance with one embodiment of the present invention, each of the host processors temporarily stores and identifies the commands and synchronously performs the corresponding operation in accordance with a corresponding one of the identified commands.

In accordance with another embodiment of the present invention, a first command of the commands transmitted by the controller comprises an identification message, and the host processors identify in accordance with the identification message that the first command and the following commands are continuously transmitted without time interval therebetween.

Yet another aspect of the present invention provides a method for controlling a video wall system, in which the video wall system comprises a plurality of host processors connected in series. The method comprises the step of the host processors sequentially receiving a plurality of continuous commands in accordance with connections of the host processors, wherein the commands are independent from each other and have no transmission delay time therebetween, and the step of the host processors synchronously performing corresponding operations in accordance with the commands.

In accordance with one embodiment of the present invention, the commands are RS232 commands transmitted from an RS232 serial data communication interface, a first command of the commands comprises an identification message, and the identification message is provided for identification of the first command and the following commands being continuously transmitted without time interval therebetween.

In accordance with another embodiment of the present invention, the step of the host processors synchronously performing the corresponding operations in accordance with the commands further comprises the step of each of the host processors temporarily storing and identifying the commands and the step of each of the host processors synchronously performing the corresponding operation in accordance with a corresponding one of the identified commands.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference to the accompanying drawings as follows.

DESCRIPTION OF THE EMBODIMENTS

In the following description, several specific details are presented to provide a thorough understanding of the embodiments of the present invention. One skilled in the relevant art will recognize, however, that the present invention can be practiced without one or more of the specific details, or in combination with or with other components, etc. In other instances, well-known implementations or operations are not shown or described in detail to avoid obscuring aspects of various embodiments of the present invention.

The terms used in this specification generally have their ordinary meanings in the art and in the specific context where each term is used. The use of examples anywhere in this specification, including examples of any terms discussed herein, is illustrative only, and in no way limits the scope and meaning of the invention or of any exemplified term. Likewise, the present invention is not limited to various embodiments given in this specification.

As used herein, the terms "comprising," "including," "having," "containing," "involving," and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present invention. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

Figure 1:
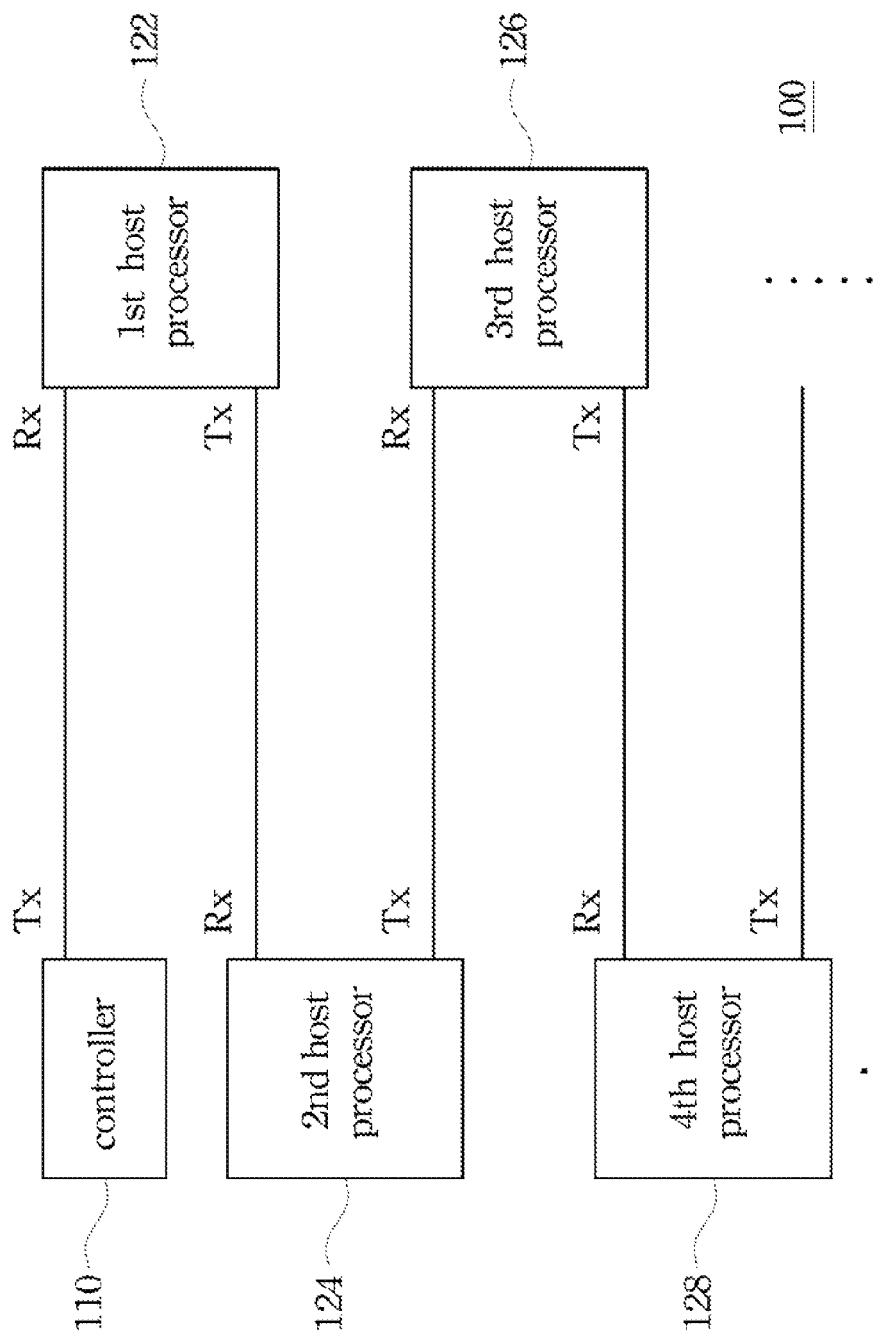
FIG. 1 is a diagram of a video wall system according to one embodiment of the present invention.

FIG. 1 is a diagram of a video wall system according to one embodiment of the present invention. The video wall system includes a controller 110 and a plurality of host processors (e.g. $1^{st}$ host processor 122, $2^{nd}$ host processor 124, $3^{rd}$ host processor 126, $4^{th}$ host processor 128, etc.), in which the host processors are connected in series, and a transmitting end of the controller 110 is connected to a receiving end of a first host processor of the host processors.

Specifically, the transmitting end Tx of the controller 110 is connected to the receiving end Rx of $1^{st}$ host processor 122, the transmitting end Tx of $1^{st}$ host processor 122 is connected to the receiving end Rx of $2^{nd}$ host processor 124, the transmitting end Tx of $2^{nd}$ host processor 124 is connected to the receiving end Rx of $3^{rd}$ host processor 126, the transmitting end Tx of $3^{rd}$ host processor 126 is connected to the receiving end Rx of $4^{th}$ host processor 128, and so on. Thus, the controller 110, $1^{st}$ host processor 122, $2^{nd}$ host processor 124, $3^{rd}$ host processor 126, $4^{th}$ host processor 128, etc., are connected in series in the video wall system 100.

In practice, the controller 110 can be a single chip, a processor, a computer or any device which is able to send controlling signals or controlling commands, and the foregoing host processors can be the video wall host computers which are applied in the video wall system 100 and configured for processing the controlling signals or controlling commands transmitted by the controller 110, to further perform corresponding operations (e.g. making the displays show corresponding image frames).

Figure 2:
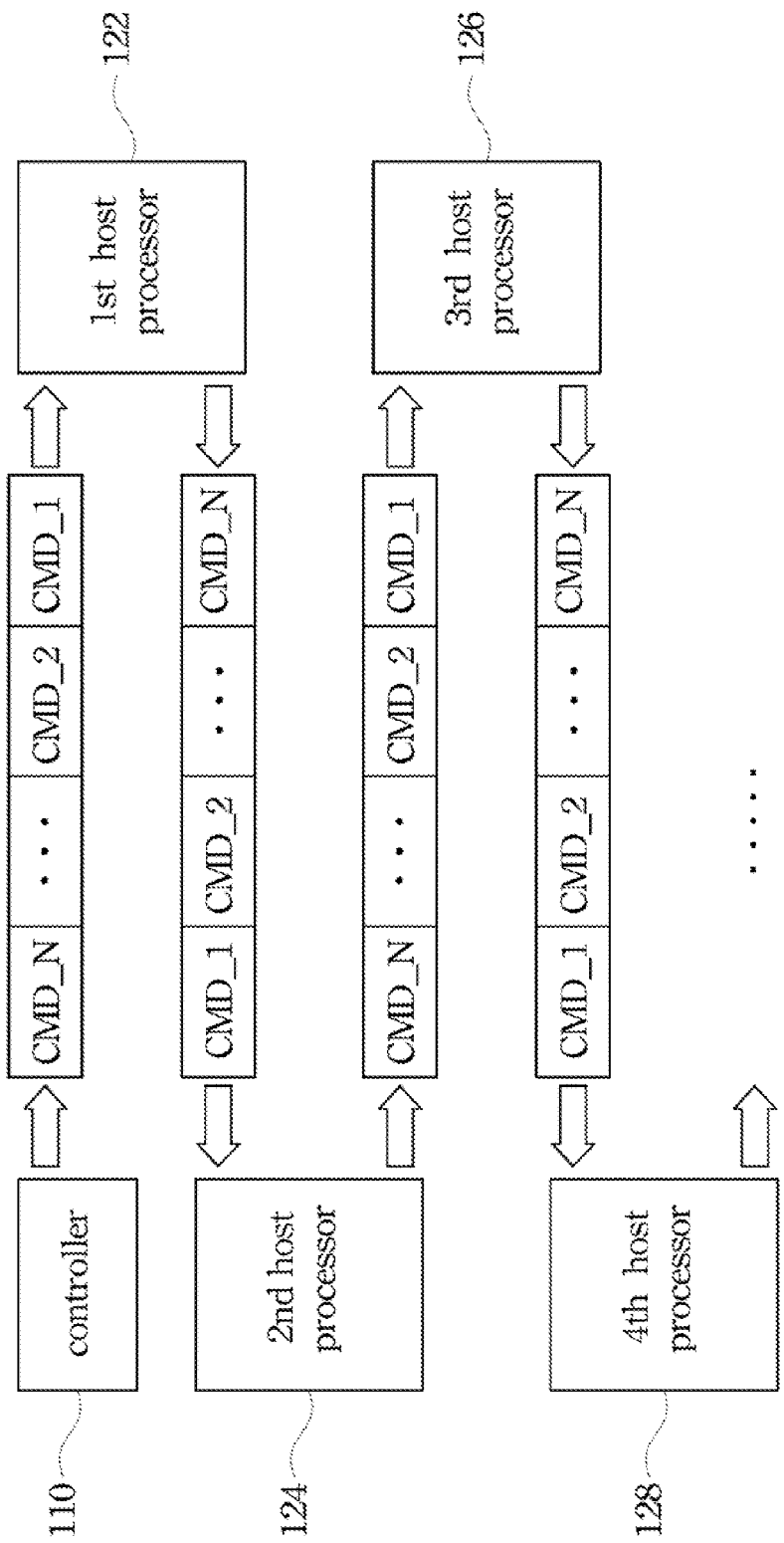
FIG. 2 is an operation diagram of the video wall system shown in FIG. 1 according to one embodiment of the present invention.

FIG. 2 is an operation diagram of the video wall system shown in FIG. 1 according to one embodiment of the present invention. As illustrated in FIG. 2, the controller 110 transmits a plurality of continuous commands (e.g. CMD_1, CMD_2, CMD_N) without time interval therebetween to each of the host processors. Since the controller 110, $1^{st}$ host processor 122, $2^{nd}$ host processor 124, $3^{rd}$ host processor 126, $4^{th}$ host processor 128, etc. are connected in series, the continuous commands CMD_1, CMD_2, CMD_N are transmitted one by one to $1^{st}$ host processor 122, $2^{nd}$ host processor 124, $3^{rd}$ host processor 126, $4^{th}$ host processor 128, etc. In other words, each of the host processors would receive the continuous commands CMD_1, CMD_2, ... CMD_N to further perform the corresponding operations. After receiving the continuous commands CMD_1, CMD_2, CMD_N, the host processors synchronously perform the corresponding operations in accordance with the commands.

It is noticed that "continuous commands without time interval therebetween" may be referred to as that the commands are independent from each other and have no transmission delay time therebetween; that is, the controller 110 can transmit a number of commands at one time, and the commands are continuous without delay time therebetween.

The continuous commands have no transmission delay time therebetween, so the host processors are basically able to synchronously perform the corresponding operations in accordance with the corresponding commands under the condition of no physical circuit transmission delay.

In one embodiment, each of the host processors is equipped with a central processing unit (CPU) with a single core and is loaded with an operating system supporting a single thread. In other words, each of the host processors operates as a simplex system, which processes one task each time. In addition, the foregoing commands can be RS232 commands transmitted from an RS232 serial data communication interface, standard of which is defined by the Electronic Industries Association (EIA), such that the host processors receive the RS232 commands to be controlled. Furthermore, the size of each command can be 8 bytes, and each of the host processors can be set to receive at most 2048 bytes; that is, each of the host processors can process 256 commands continuously, but it is not limited.

In another embodiment, each of the host processors can temporarily store and identify the commands CMD_1, CMD_2, CMD_N and synchronously perform the corresponding operation in accordance with a corresponding one of the identified commands.

For example, after the host processors receive the continuous commands, $1^{st}$ host processor 122, $2^{nd}$ host processor 124, $3^{rd}$ host processor 126, $4^{th}$ host processor 128, etc. synchronously perform the corresponding operations, in which $1^{st}$ host processor 122 performs the corresponding operation in accordance with the command CMD_1, $2^{nd}$ host processor 124 performs the corresponding operation in accordance with the command CMD_2, $3^{rd}$ host processor 126 performs the corresponding operation in accordance with the command CMD_3, $4^{th}$ host processor 128 performs the corresponding operation in accordance with the command CMD_4, and so on.

The host processors perform the corresponding operations after temporarily storing and identifying the continuous commands, so the host processors are basically able to synchronously perform the corresponding operations in accordance with the corresponding commands under the condition of no physical circuit transmission delay.

In still another embodiment, the first command CMD_1 transmitted by the controller 110 comprises an identification message, and the host processors identify that the first command CMD_1 and the following commands are continuously transmitted without time interval therebetween, in accordance with the identification message.

Figure 3:
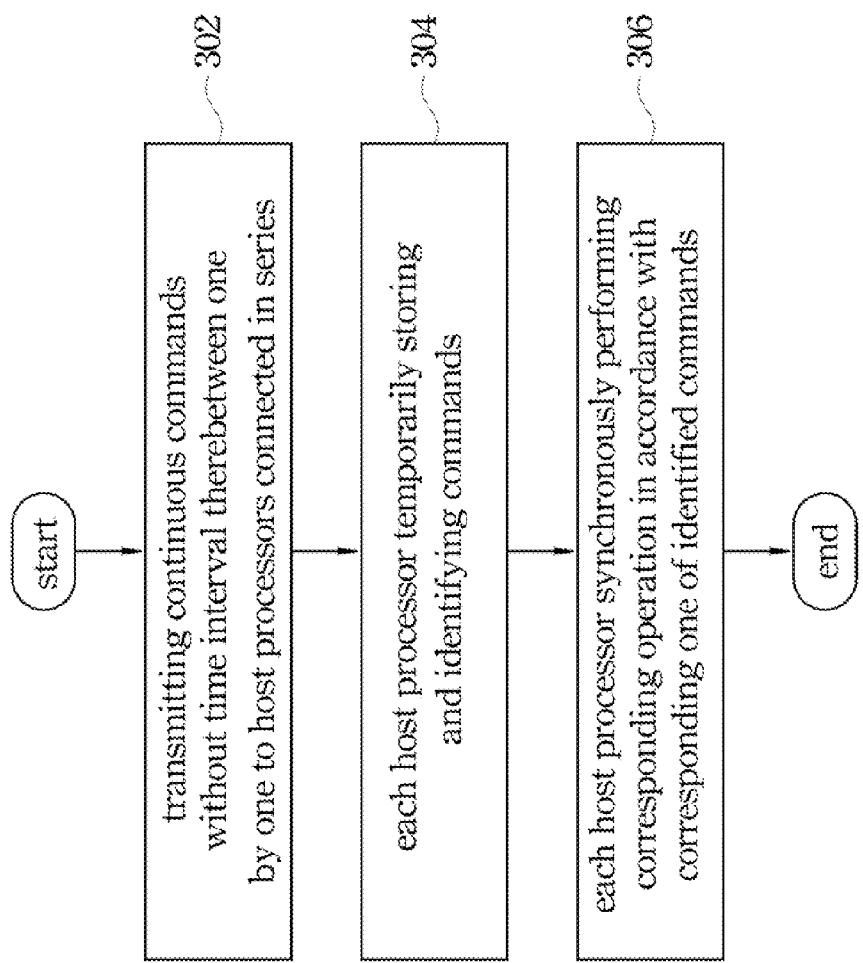
FIG. 3 is a flowchart of a method for controlling a video wall system according to one embodiment of the present invention.

FIG. 3 is a flowchart of a method for controlling a video wall system according to one embodiment of the present invention. The method can be applied in the video wall system 100 shown in FIG. 1, but it is not limited thereto. For convenient description of the present embodiment, FIG. 1 and FIG. 3 are referred hereinafter at the same time.

The steps are not recited in the sequence in which the steps are performed in the present embodiment. That is, unless the sequence of the steps is expressly indicated, the sequence of the steps is interchangeable, and all or part of the steps may be simultaneously, partially simultaneously, or sequentially performed. The flowchart shown in FIG. 3 is merely one embodiment and not limiting the present invention.

First, a plurality of continuous commands without time interval therebetween are transmitted one by one to a number of host processors connected in series (Step 302). For example, the continuous commands CMD_1, CMD_2, CMD_N are transmitted one by one to $1^{st}$ host processor 122, $2^{nd}$ host processor 124, $3^{rd}$ host processor 126, $4^{th}$ host processor 128, etc., such that $1^{st}$ host processor 122, $2^{nd}$ host processor 124, $3^{rd}$ host processor 126, $4^{th}$ host processor 128, etc. sequentially receive the continuous commands CMD_1, CMD_2, CMD_N.

After that, the host processors synchronously perform the corresponding operations in accordance with the commands. In one embodiment, the step of the host processors synchronously performing the corresponding operations in accordance with the commands further includes the following steps in which each of the host processors temporarily stores and identifies the commands (Step 304) and each of the host processors synchronously performs the corresponding operation in accordance with a corresponding one of the identified commands (Step 306).

For example, after the host processors receive the continuous commands, $1^{st}$ host processor 122, $2^{nd}$ host processor 124, $3^{rd}$ host processor 126, $4^{th}$ host processor 128, etc. synchronously perform the corresponding operations, in which $1^{st}$ host processor 122 performs the corresponding operation in accordance with the command CMD_1, $2^{nd}$ host processor 124 performs the corresponding operation in accordance with the command CMD_2, $3^{rd}$ host processor 126 performs the corresponding operation in accordance with the command CMD_3, $4^{th}$ host processor 128 performs the corresponding operation in accordance with the command CMD_4, and so on.

In addition, the foregoing commands can be RS232 commands transmitted from an RS232 serial data communication interface, the first command of the commands comprises an identification message, and the identification message is provided for identification of the first command and the following commands being continuously transmitted without time interval therebetween.

Figure 4:
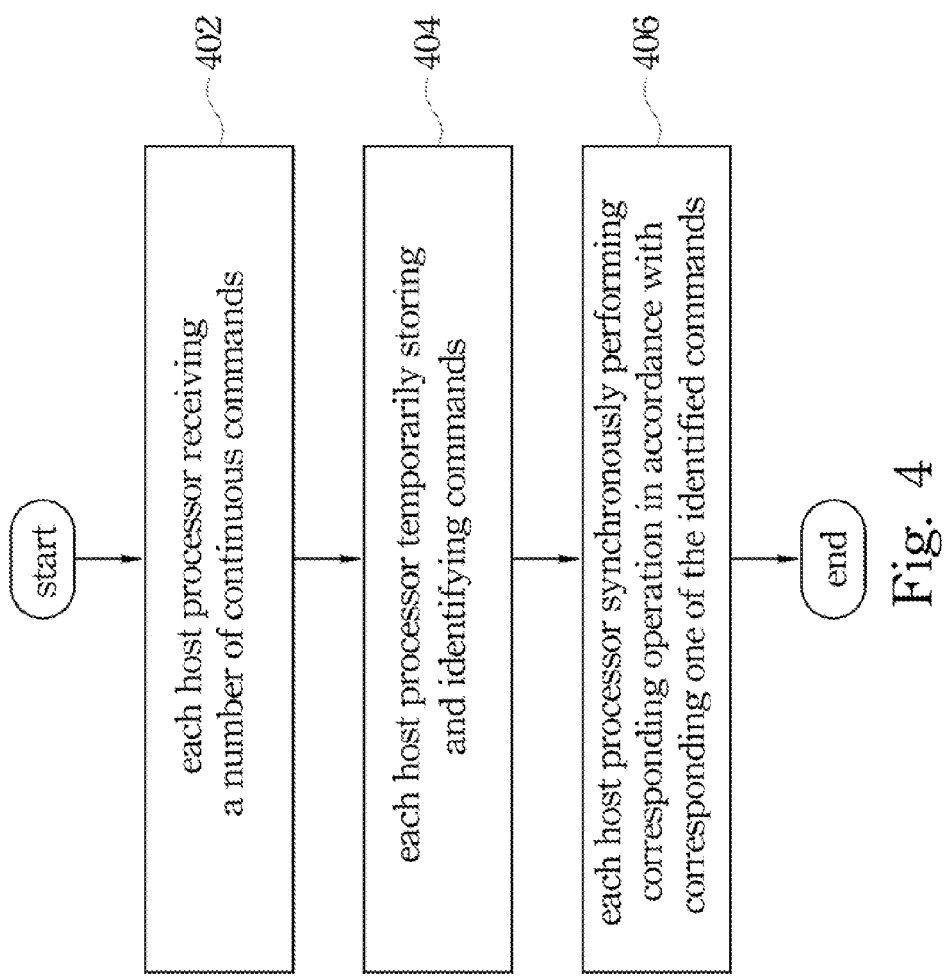
FIG. 4 is a flowchart of a method for controlling a video wall system according to another embodiment of the present invention.

FIG. 4 is a flowchart of a method for controlling a video wall system according to another embodiment of the present invention. The controlling method can be applied in the video wall system 100 shown in FIG. 1, but not limited thereto. For convenient description of the present embodiment, FIG. 1 and FIG. 4 are referred hereinafter at the same time.

The steps are not recited in the sequence in which the steps are performed in the present embodiment. That is, unless the sequence of the steps is expressly indicated, the sequence of the steps is interchangeable, and all or part of the steps may be simultaneously, partially simultaneously, or sequentially performed. The flowchart shown in FIG. 4 is merely one embodiment and not limiting the present invention.

First, each of the host processors receives a number of continuous commands (Step 402), in which the commands are independent from each other and have no transmission delay time therebetween. For example, $1^{st}$ host processor 122, $2^{nd}$ host processor 124, $3^{rd}$ host processor 126, $4^{th}$ host processor 128, etc. receive the continuous commands CMD_1, CMD_2, CMD_N in accordance with connections of the host processors.

Then, the host processors synchronously perform the corresponding operations in accordance with the commands. In one embodiment, the step of the host processors synchronously performing the corresponding operations in accordance with the commands further includes the following steps in which each of the host processors temporarily stores and identifies the commands (Step 404) and each of the host processors synchronously performs the corresponding operation in accordance with a corresponding one of the identified commands (Step 406).

For example, after the host processors receive the continuous commands, $1^{st}$ host processor 122, $2^{nd}$ host processor 124, $3^{rd}$ host processor 126, $4^{th}$ host processor 128, etc. synchronously perform the corresponding operations, in which $1^{st}$ host processor 122 performs the corresponding operation in accordance with the command CMD_1, $2^{nd}$ host processor 124 performs the corresponding operation in accordance with the command CMD_2, $3^{rd}$ host processor 126 performs the corresponding operation in accordance with the command CMD_3, $4^{th}$ host processor 128 performs the corresponding operation in accordance with the command CMD_4, and so on.

Similarly, the foregoing commands can be RS232 commands transmitted from an RS232 serial data communication interface, the first command of the commands comprises an identification message, and the identification message is provided for identification of the first command and the following commands being continuously transmitted without time interval therebetween.

In a conventional manner of controlling the host processors, each of the host processors has to employ a certain time period to process a command after receiving the command, and then the other command can be received normally after the processing procedure is finished. Thus a sufficient period of delay time has to be added between two neighboring commands, making sure that each command can be executed correctly by each of the host processors. However, a large amount of delay time is generated accordingly, causing the efficiency of the whole system to deteriorate.

Compared to the conventional manner, the action of transmitting the continuous commands without time interval therebetween is employed in the embodiment of the present invention. As a result, in the ideal condition that the delay time caused by physical transmission or circuit transmission is not considered, each of the host processors basically can concurrently receive the continuous commands, thereby being able to synchronously perform the operations corresponding to the commands in real time, such that the consistence and efficiency of the whole performance for the video wall also can be significantly improved. The efficiency can be improved more significantly than the conventional manner especially under the condition of the video wall having more displays.

As is understood by a person skilled in the art, the foregoing embodiments of the present invention are illustrative of the present invention rather than limiting of the present invention. It is intended to cover various modifications and similar arrangements included within the spirit and scope of the appended claims, the scope of which should be accorded with the broadest interpretation so as to encompass all such modifications and similar structures.

What is claimed is:

1. A method for controlling a video wall system, the video wall system comprising a plurality of host processors connected in series, the method comprising:
    transmitting a plurality of continuous commands without time interval therebetween one by one to the host processors connected in series; and
    the host processors synchronously performing corresponding operations in accordance with the commands.

2. The method as claimed in claim 1, wherein the commands are RS232 commands transmitted from an RS232 serial data communication interface.

3. The method as claimed in claim 1, wherein a first command of the commands comprises an identification message, and the identification message is provided for identification of the first command and the following commands being continuously transmitted without time interval therebetween.

4. The method as claimed in claim 1, wherein the step of the host processors synchronously performing the corresponding operations in accordance with the commands further comprises:
    each of the host processors temporarily storing and identifying the commands; and
    each of the host processors synchronously performing the corresponding operation in accordance with a corresponding one of the identified commands.

5. A video wall system comprising:
    a controller; and
    a plurality of host processors connected in series, a transmitting end of the controller being connected to a receiving end of a first host processor of the host processors;
    wherein the controller is configured for transmitting a plurality of continuous RS232 commands without time interval therebetween to each of the host processors, and the host processors synchronously perform corresponding operations in accordance with the RS232 commands.

6. The video wall system as claimed in claim 5, wherein each of the host processors temporarily stores and identifies the commands and synchronously performs the corresponding operation in accordance with a corresponding one of the identified commands.

7. The video wall system as claimed in claim 5, wherein a first command of the commands transmitted by the controller comprises an identification message, and the host processors identify in accordance with the identification message that the first command and the following commands are continuously transmitted without time interval therebetween.

8. A method for controlling a video wall system, the video wall system comprising a plurality of host processors connected in series, the method comprising:
    the host processors sequentially receiving a plurality of continuous commands in accordance with connections of the host processors, wherein the commands are independent from each other and have no transmission delay time therebetween; and
    the host processors synchronously performing corresponding operations in accordance with the commands.

9. The method as claimed in claim 8, wherein the commands are RS232 commands transmitted from an RS232 serial data communication interface, a first command of the commands comprises an identification message, and the identification message is provided for identification of the first command and the following commands being continuously transmitted without time interval therebetween.

10. The method as claimed in claim 8, wherein the step of the host processors synchronously performing the corresponding operations in accordance with the commands further comprises:
    each of the host processors temporarily storing and identifying the commands; and
    each of the host processors synchronously performing the corresponding operation in accordance with a corresponding one of the identified commands.

\* \* \* \* \*